UNITED STATES PATENT OFFICE.

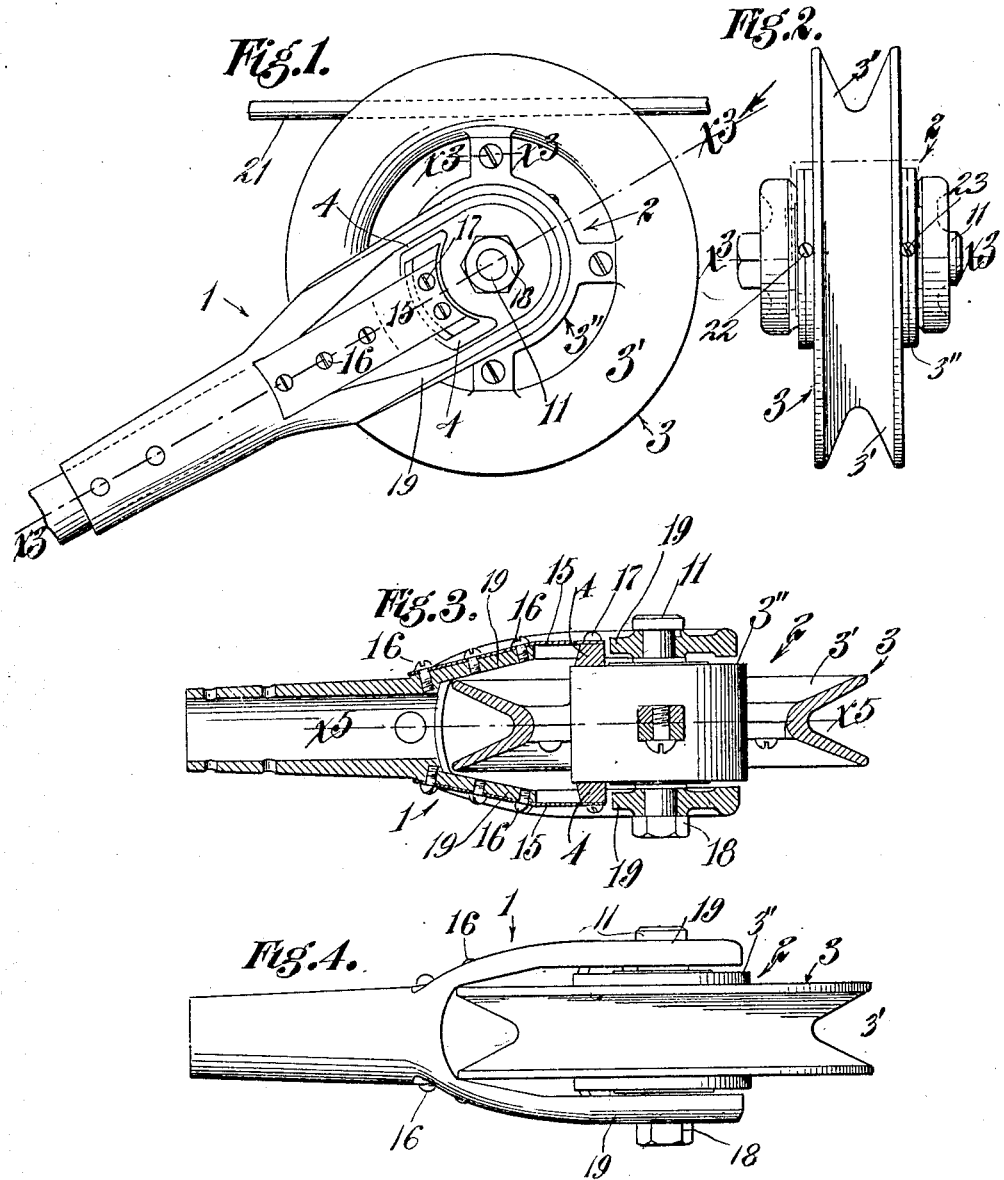

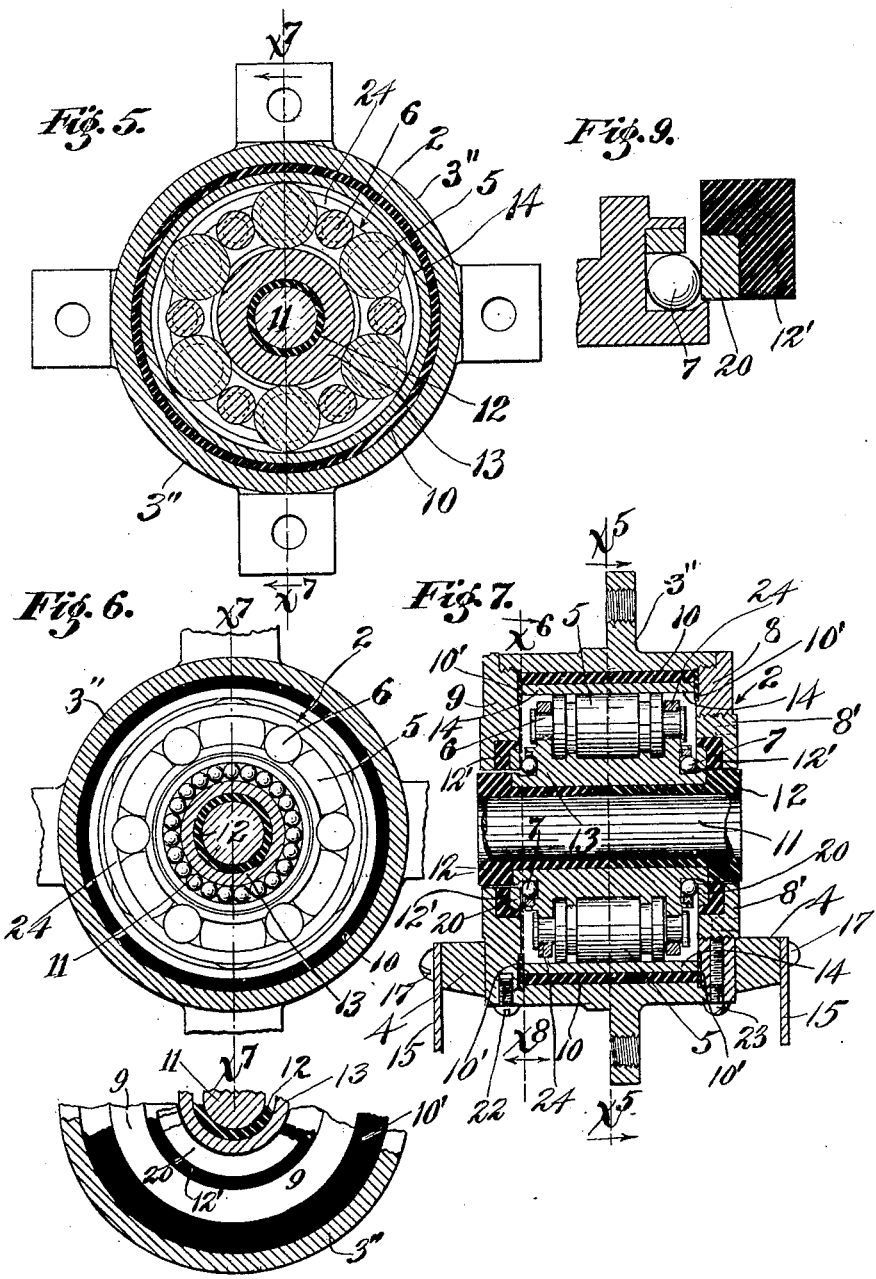

WILLIAM H. SHEASBY, OF LOS ANGELES, CALIFORNIA, ASSIGNOR TO THE ANTIFRICTION JOURNAL BOX COMPANY, OF LOS ANGELES, CALIFORNIA, A CORPORATION OF CALIFORNIA.

ROLLER-BEARING TROLLEY.

No. 913,240.      Specification of Letters Patent.      Patented Feb. 23, 1909.

Application filed February 28, 1906. Serial No. 303,442.

*To all whom it may concern:*

Be it known that I, WILLIAM H. SHEASBY, a citizen of the United States, residing at Los Angeles, in the county of Los Angeles and State of California, have invented a new and useful Roller-Bearing Trolley, of which the following is a specification.

It is one of the objects of this invention to provide a practical trolley for electric railways which will not require lubrication.

Other objects are simplicity, strength, durability, and convenience of assembling.

The accompanying drawings illustrate the invention.

Figure 1 is a side elevation of the trolley in running position. Fig. 2 is an end elevation of the harp with trolley wheel in place. The direction of sight is indicated by the large arrow at upper left hand of Fig. 1. Fig. 3 is a longitudinal, sectional view on lines $x^3$—$x^3$, Fig. 1, the hub of the wheel being intact and the trolley pole being omitted. Fig. 4 is a top view of the trolley. Fig. 5 is a transverse section of the hub and roller bearing of the wheel on line $x^5$—$x^5$, Figs. 3 and 7. Fig. 6 is a transverse section of the hub and roller bearing on line $x^6$—$x^8$, Fig. 7. Fig. 7 is an axial section of the hub and roller bearing, on line $x^7$—$x^7$, Figs. 5 and 6. Fig. 8 is a fragmental view looking left from line $x^6$—$x^8$, Fig. 7. Fig. 9 is an enlarged detail of the thrust ball bearing showing the retaining means.

The invention comprises the combination with a trolley harp, as 1, of an antifriction bearing, as 2, carried by and insulated from the harp, a conducting wheel 3 carried by and insulated from the antifriction bearing, and a brush 4 contacting with the conducting wheel.

The antifriction bearing of the trolley consists in a peripheral and end thrust antifriction bearing means, the former being in the nature of bearing and separating rollers 5, 6, respectively, and the latter means comprising balls 7, all of which are insulated from the harp by insulating means which I shall hereinafter describe.

The wheel of the trolley comprises a conducting rim 3' and a conducting hub 3''. The antifriction bearing 2 is mounted inside the hub.

8, 8', and 9, designate end members for the hub, and 10, 10', insulating means between the antifriction bearing and the hub.

11 is a pin carried by the harp and supporting the antifriction bearing 2.

12, 12', designate insulating means between the antifriction bearing and the pin, said means consisting in an insulating tube of rubber or other suitable material around the pin.

13 is a bearing-sleeve around the insulating tube 12 on which sleeve the antifriction rollers 5 roll, being held in place by a case 14 around the rollers, the insulating means 10, 10', being around the case and the hub 3'' being around the case-insulating means 10, 10'.

The end members 8, 8', 9, of the hub form annular conductors at the ends of the hub of the wheel. The pin 11 constitutes wheel-supporting means carried by the harp and supporting and insulated from the antifriction bearing.

The brushes are in the form of shoes 4 mounted on conducting spring means 15 respectively, which are secured to the harp 1 by screws 16.

17 designates screws detachably securing the brush shoes to springs 15.

18 is a nut on the end of the pin 11.

Each brush 4 extends through a prong 19 of the harp to which its brush-spring 15 is secured. Said prong projects at each edge of the brush-springs 15 respectively, so that the brush and springs are chambered inside the prongs, thus to avoid danger of being struck by external objects.

The contact shoes 4 may be of carbon, copper, or any suitable material, but are preferably made of aluminum, thus to secure a superior contact and increase the wearing qualities. Furthermore, by making the shoes of aluminum the same can be made of blocks of considerable thickness without overloading the springs which carry the same.

An important advantage is obtained by making the spring 15 and shoe 4 at each side of the harp in separate pieces so that the best contact-making material may be used for the shoe and the most resilient material may be used for the spring. A further advantage is obtained in that the shoe may be renewed when worn, without casting aside the spring.

The insulating means 10' consist in two washers of rubber or other non-conducting material abutting against the ends of the insulating sleeve 10 and insulating the ends of the case 14 from the end hub members 8, 9, which are chambered to receive annular bearing plates 20 which sustain the balls 7 against end thrust.

The insulating means 12' consist in two chambered washers of non-conducting material which are seated in the inside faces of the hub end members 8' and 9. The hub end members 8 and 8' are two screw-threaded rings, the inner ring 8' being an adjusting ring to take up end play of the sleeve 13.

In practical operation, the current from the trolley wire 21 passes through the rim 3' and the hub end members 8, 8' and 9, direct to the brushes without reaching the antifriction rollers or balls.

22, 23, designate lock screws to prevent the hub ends from loosening.

The insulating tube 12 is formed in two sections slipped into the bearing-sleeve from either end and meeting in the middle as clearly shown in Fig. 7. The outer ends of said sleeve overlap the outer ends of the bearing-sleeve and terminate close to the chambered washers 12', 12' so that the insulation between the rollers and the pin is complete.

24 designates retaining rings to hold the separating rollers in place. The bearing can be assembled in any well-known way. When the bearing and separating rollers are assembled the separating rollers may be assembled around the sleeve 13 and then by bringing the same close together the rings 24 may be brought into the seats therefor in the ends of the separating rollers, after which the bearing rollers may be caught by a rubber band and thus held until inserted in the hub, whereupon the assembling may be readily completed in an obvious way not necessary to be described herein.

What I claim is:

1. A trolley harp, a pin carried by the harp, an insulating tube around the pin, a sleeve around the tube, rollers on the sleeve, a case around the rollers, insulating means around the case, a hub around the case-insulating means, a wheel rim carried by said hub, and a brush contacting with the hub.

2. A trolley provided with a bearing sleeve, rollers outside said sleeve, a pin and an insulating tube around said pin inside said sleeve, the ends of said tube overlapping the ends of said sleeve.

3. A trolley provided with a bearing sleeve, rollers outside said sleeve, a pin and an insulating tube around said pin inside said sleeve, said tube being formed in two sections the ends thereof overlapping the ends of the sleeve.

In testimony whereof, I have hereunto set my hand this 27th day of February, 1906.

WILLIAM H. SHEASBY.

In presence of—
MARY E. SULLIVAN,
ALMON W. LYTLE.